US009872509B2

(12) United States Patent
Zitnik

(10) Patent No.: US 9,872,509 B2
(45) Date of Patent: Jan. 23, 2018

(54) SYSTEMS AND METHODS FOR IMPROVED RENDERING

(71) Applicant: James K. Zitnik, Southlake, TX (US)

(72) Inventor: James K. Zitnik, Southlake, TX (US)

( * ) Notice: Subject to any disclaimer, the term of this patent is extended or adjusted under 35 U.S.C. 154(b) by 507 days.

(21) Appl. No.: 14/180,008

(22) Filed: Feb. 13, 2014

(65) Prior Publication Data

US 2015/0050402 A1 Feb. 19, 2015

Related U.S. Application Data

(60) Provisional application No. 61/866,775, filed on Aug. 16, 2013.

(51) Int. Cl.
| | |
|---|---|
| *A23D 9/04* | (2006.01) |
| *C11B 1/02* | (2006.01) |
| *C11B 1/06* | (2006.01) |
| *C11B 1/08* | (2006.01) |
| *C11B 1/12* | (2006.01) |
| *C11B 1/16* | (2006.01) |
| *C11B 3/16* | (2006.01) |
| *A23J 3/04* | (2006.01) |

(52) U.S. Cl.
CPC ........ *A23D 9/04* (2013.01); *A23J 3/04* (2013.01); *C11B 1/02* (2013.01); *C11B 1/06* (2013.01); *C11B 1/08* (2013.01); *C11B 1/12* (2013.01); *C11B 1/16* (2013.01); *C11B 3/16* (2013.01)

(58) Field of Classification Search
CPC ... C11B 1/10; C11B 13/00; C11B 1/06; C11B 1/16; C11B 1/00; C11B 3/006; C11B 3/16; C11B 1/12; C11B 3/001
USPC .................................................. 426/417, 480
See application file for complete search history.

(56) References Cited

U.S. PATENT DOCUMENTS 3,230,054 A 1/1966 Ling
3,398,676 A 8/1968 Theobald et al.
(Continued)

FOREIGN PATENT DOCUMENTS

GB 579671 * 8/1946

OTHER PUBLICATIONS

European Search Report for EP Application 14175098.4, Feb. 11, 2015, 9 pages, European Patent Office.

*Primary Examiner* — Vera Stulii
(74) *Attorney, Agent, or Firm* — Kirby B. Drake; Klemchuk LLP

(57) ABSTRACT

Systems and methods for improved rendering of animal products may utilize a multi-step process including at least a heating step through use of a steam-jacketed tube system and a pressing step to squeeze out the oils. Grinding and pre-breaking may first be used to break the fat/whole animal into pieces. The ground material may then be transported and heated in one or more steam-jacketed tubes to create a slurry. A press may then be employed to press out the oil and water from the slurry. Residual solids may be removed from the oil and water through a decanting step. Water and extremely fine materials may then be removed from the oil through a centrifuge step, and the oil may be transferred to one or more storage tanks. Following the pressing step, the protein that remains may be subjected to high pressure to squeeze out any residual fat and then may be transferred to a hammer mill to prepare into a powdered protein or other desired protein material that may be stored for later use.

17 Claims, 1 Drawing Sheet

(56) References Cited

U.S. PATENT DOCUMENTS

| | | | |
|---|---|---|---|
| 3,410,882 | A | 11/1968 | Macy et al. |
| 3,673,227 | A | 6/1972 | Keith |
| 3,730,344 | A | 3/1973 | Mason |
| 3,780,075 | A * | 12/1973 | Dufault et al. ............ C11B 1/00 554/23 |
| 3,857,989 | A | 12/1974 | King |
| 3,899,301 | A | 8/1975 | Bredeson et al. |
| 4,157,335 | A | 6/1979 | Dobbs |
| 4,166,836 | A | 9/1979 | Pikel |
| 4,259,361 | A | 3/1981 | Procter |
| 4,289,067 | A | 9/1981 | Hanak |
| 4,361,590 | A | 11/1982 | Wojcik |
| 4,844,817 | A | 7/1989 | Flanigan et al. |
| 5,688,549 | A | 11/1997 | Roehrig et al. |
| 5,725,897 | A | 3/1998 | Schaefer et al. |
| 5,762,993 | A | 6/1998 | Gundlach et al. |
| 5,786,015 | A | 7/1998 | Warren et al. |
| 5,965,184 | A | 10/1999 | Schaefer et al. |
| 5,972,403 | A * | 10/1999 | Tiller ................... A23J 1/002 426/467 |
| 6,159,515 | A | 12/2000 | Schaefer et al. |
| 6,589,422 | B2 | 7/2003 | Low |
| 6,685,975 | B2 | 2/2004 | Saxby |
| 6,732,454 | B2 | 5/2004 | Anderson et al. |
| 6,949,265 | B1 | 9/2005 | Schaefer et al. |
| 7,364,765 | B2 | 4/2008 | Baensch |
| 7,456,305 | B2 | 11/2008 | Piacentini et al. |
| 7,507,869 | B2 | 3/2009 | Cisneros |
| 7,661,355 | B2 | 2/2010 | Kremer |
| 7,666,456 | B2 | 2/2010 | Garwood |
| 7,687,648 | B2 | 3/2010 | Smallridge et al. |
| 7,823,811 | B2 | 11/2010 | Mosley et al. |
| 7,887,398 | B2 | 2/2011 | Packer et al. |
| 7,897,050 | B2 | 3/2011 | Waibel et al. |
| 7,984,865 | B2 | 7/2011 | Mosley et al. |
| 8,080,270 | B1 | 12/2011 | Schaefer et al. |
| 8,163,945 | B2 * | 4/2012 | Thornhill ................ C11B 13/00 241/65 |
| 2004/0182260 | A1 | 9/2004 | Miles |
| 2004/0186307 | A1 | 9/2004 | Piacentini et al. |
| 2005/0106715 | A1 | 5/2005 | Niv et al. |
| 2009/0061067 | A1 | 3/2009 | Tilseth et al. |
| 2010/0160658 | A1 | 6/2010 | Kemper et al. |
| 2010/0196981 | A1 | 8/2010 | Aharon et al. |
| 2010/0233349 | A1 | 9/2010 | Smallridge et al. |
| 2010/0234569 | A1 | 9/2010 | Helling et al. |
| 2012/0128838 | A1 | 5/2012 | Virippil et al. |
| 2012/0141645 | A1 | 6/2012 | Tomcak et al. |
| 2012/0171352 | A1 | 7/2012 | Kelleher et al. |
| 2012/0231148 | A1 | 9/2012 | Garwood |
| 2012/0263838 | A1 | 10/2012 | Johnston |
| 2013/0115349 | A1 | 5/2013 | Garwood |

* cited by examiner

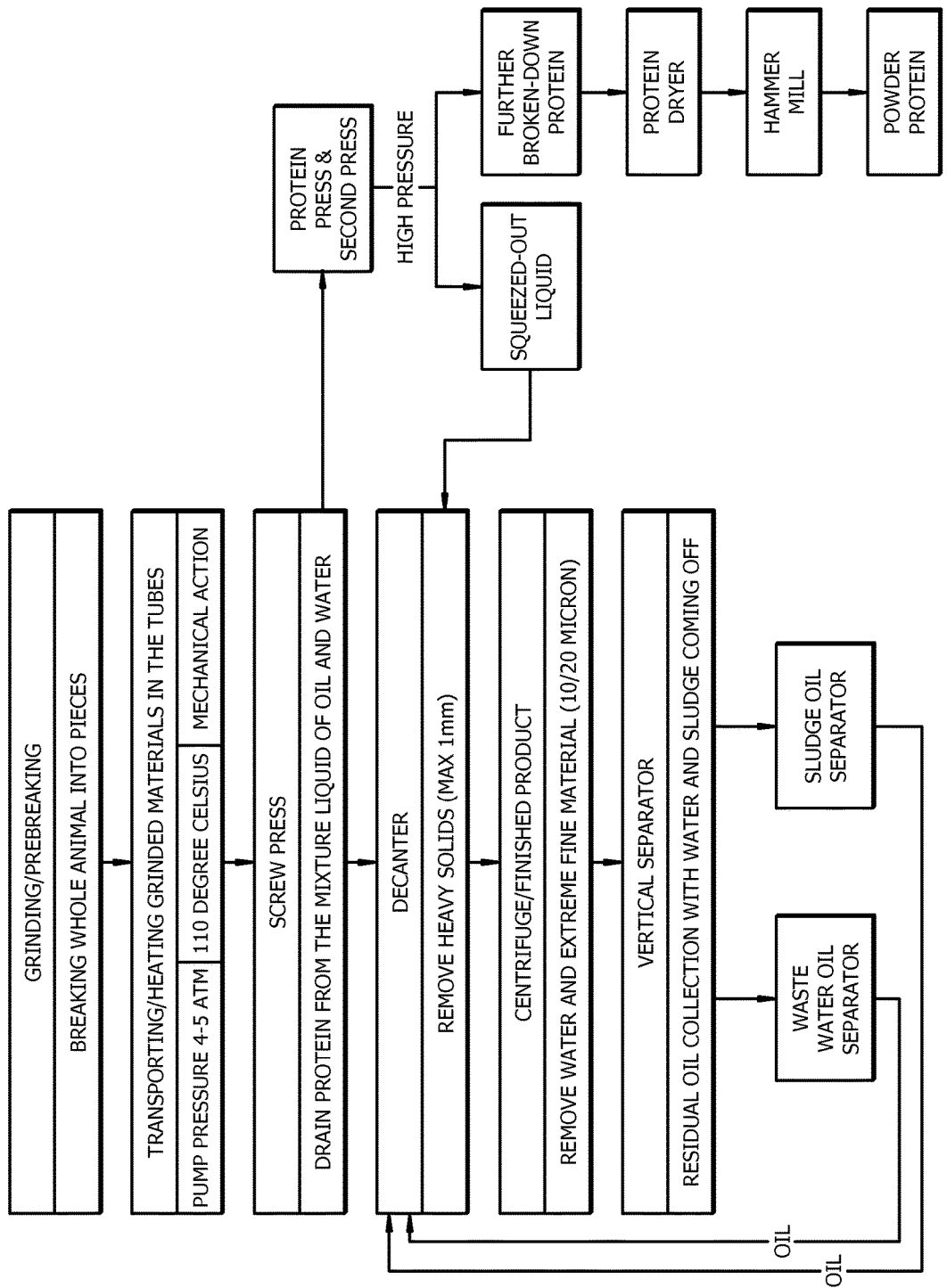

US 9,872,509 B2

SYSTEMS AND METHODS FOR IMPROVED RENDERING

CROSS-REFERENCE TO RELATED APPLICATION

This application claims the benefit of U.S. Provisional Application No. 61/866,775, entitled "Systems and Methods for Improved Rendering," filed Aug. 16, 2013, which is incorporated herein by reference in its entirety.

FIELD OF THE DISCLOSURE

The present disclosure generally relates to rendering, and more particularly to systems and methods for improved rendering.

BACKGROUND

Rendering is a process that generally converts animal products into more useful materials. Rendering typically separates the fat from the bone and protein and yields a fat commodity (such as grease) and a protein meal (meat or bone meal). Batch cooking systems and continuous cooker systems have been used for rendering. While these systems may be helpful in rendering, there are deficiencies that can lead to less than desirable end products and also can be energy intensive and are expensive to operate.

SUMMARY

Embodiments of the present disclosure may provide systems and methods for improved rendering of animal products utilizing a multi-step process including at least a heating step through use of a steam-jacketed tube system and a pressing step to squeeze out the oils. Additional steps may be employed without departing from the present disclosure.

Embodiments of the present disclosure may provide a method for improved rendering of animal products, the method comprising grinding the animal products to form ground materials, transporting and heating the ground materials in one or more steam-jacketed tubes to create a slurry, and pressing the slurry to separate protein from oil and water. The grinding step may be performed using a pre-breaker machine and a grinder. The ground materials may be heated to a temperature of approximately 110 degrees Celsius in the heating step. Pressure of approximately 4-5 ATM may be applied to the ground materials in the heating step. The method may further comprise supplying pressure to the slurry between the heating step and the pressing step, and this pressure may be supplied through a progressive cavity pump. The pressing step may be performed with a screw press.

The method may further comprise transferring the oil and water to a decanter, and removing residual solids from the oil and water to form a solution. The decanter may range in size from 10 microns to 1 millimeter. The method also may comprise centrifuging the solution to remove water and fine materials from the oil, employing a vertical separator to further remove waste water and sludge from the oil, employing a waste water oil separator to further separate oil from waste water, and/or employing a sludge oil separator to further separate oil from the sludge. Oil separated through use of the waste water oil separator and the sludge oil separator may be returned to the decanter. Oil separated through use of the waste water oil separator and the sludge oil separator may be transferred to a storage tank.

The method also may comprise applying pressure to the protein that has been separated from the oil and water via a protein press, thereby forming further broken-down protein and squeezing residual liquid out of the protein. The squeezed out residual liquid may be transferred to the decanter. The further broken-down protein may be transferred to a protein dryer to form a dried protein, and the dried protein may be crushed to form a powder protein. This crushing step may be performed using a hammer mill.

Embodiments of the present disclosure also may provide a method for improved rendering of animal products comprising grinding the animal products to form ground materials, transporting and heating the ground materials in one or more steam-jacketed tubes to create a slurry, pressing the slurry to separate protein from oil and water, applying pressure to the protein that has been separated from the oil and water via a protein press, thereby forming further broken-down protein and squeezing residual liquid out of the protein, transferring the squeezed out residual liquid to the decanter, transferring the further broken-down protein to a protein dryer to form a dried protein, and crushing the dried protein to form a powder protein.

Other embodiments of the present disclosure may provide a method for improved rendering of animal products comprising grinding the animal products to form ground materials, transporting and heating the ground materials in one or more steam-jacketed tubes to create a slurry, pressing the slurry to separate protein from oil and water, transferring the oil and water to a decanter, removing residual solids from the oil and water to form a solution, centrifuging the solution to remove water and fine materials from the oil, employing a vertical separator to further remove waste water and sludge from the oil, employing a waste water oil separator to further separate oil from waste water, and employing a sludge oil separator to further separate oil from the sludge.

BRIEF DESCRIPTION OF THE DRAWING

For a more complete understanding of this disclosure, reference is now made to the following description, taken in conjunction with the accompanying drawings, in which:

The FIGURE depicts a system and method for improved rendering according to an embodiment of the present disclosure.

DETAILED DESCRIPTION

Rendering of animal products according to embodiments of the present disclosure may be accomplished through a multi-step process including at least a heating step employing one or more steam-jacketed tubes as well as a pressing step. However, as will be described in more detail below, additional steps may be employed to subject the animal products to heat and pressure to achieve high quality oil and protein products through rendering according to embodiments of the present disclosure. Systems and methods according to embodiments of the present disclosure also may provide considerable energy savings in rendering, particularly as the capital expenditures (CAPEX) for such an improved rendering system may be considerably lower when compared to existing batch or continuous rendering systems due to cheaper installation and lower operating costs.

The FIGURE depicts a method for improved rendering according to an embodiment of the present disclosure. In the grinding/pre-breaking step, fat and whole animal may be broken into pieces. A pre-breaker machine may be used to break up the bones, and a grinder, such as a Weiler grinder, may be used for the grinding portion of this step. However, it should be appreciated that other similarly functioning machines may be used to perform this step without departing from the present disclosure. By finely grinding fat and whole animal in this early step of the process, additional surface area may be created. This allows a much lower use of energy to create the desired effect of separating the liquid from the protein in one or more steam-jacketed tubes as described below.

Once the grinding/pre-breaking step is completed, the ground materials may be transported and heated in one or more steam-jacketed tubes. When heated, the ground materials may liquefy as they travel through the steam-jacketed tubes to create a slurry. It should be appreciated that the pump pressure used in this step may be approximately 4-5 ATM, and the heating may be performed at a temperature of approximately 110 degrees Celsius according to an embodiment of the present disclosure. It should be appreciated that no further mechanical action should be required to perform this step of the improved rendering method. However, further mechanical action may be employed without departing from the present disclosure.

A progressive cavity pump may be used to supply pressure to move the slurry through the steam-jacketed tubes and up to the entry point of a screw press. The screw press may then be used to press out the oil and water from the slurry according to an embodiment of the present disclosure. This may drain protein from the liquid mixture of oil and water. It should be appreciated that use of a progressive cavity pump may create a large amount of pressure (i.e., pushing approximately 8,000 lbs per hour) using a very small motor (approximately 1.25 hp). This pump may push material easily through the rendering system without the need for additional mechanical action according to embodiments of the present disclosure. The pressure employed inside of the screw press may be approximately 25,000 lbs per square inch. While this pressing step has been described as employing a screw press, it should be appreciated that other similar presses may be used without departing from the present disclosure.

Once the slurry is transferred into the press, water and oil may be separated from the protein. The oil and water may be transferred to a decanter so that residual or heavy solids may be removed from the oil and water. It should be appreciated that a minimum of a 10-micron and a maximum of 1 millimeter sized decanter should be used to perform this separation according to embodiments of the present disclosure. By using this decanting step, use of settling tanks may be eliminated and a higher quality oil product may be produced.

High pressure may be applied to the protein that has been separated from the oil and water through a protein press and/or a second press in order to further break down the protein and squeeze out any residual liquid or fat. Any residual liquid or fat that may be separated from the protein may be transferred to the decanter, and the decanting step may be employed with respect to this residual liquid or fat according to embodiments of the present disclosure.

Following the decanting step(s), a centrifuge, such as a vertical centrifuge, or other similar mechanism may be used to remove water and extremely fine material (generally below approximately 10-20 microns in size) from the oil. This centrifuge step may provide for a final separation of the oil and water.

A vertical separator or other similar mechanism may then be used for residual oil collection with water and sludge coming off. A waste water oil separator may then be used to further separate oil from the resultant waste water, wherein the separated oil may be returned to the decanter. Similarly, a sludge oil separator may then be used to further separate oil from sludge, wherein the separated oil may be returned to the decanter. It also should be appreciated that the oil that remains following the centrifuge step may then be stored in storage tanks according to embodiments of the present disclosure. The centrifuge step, like the decanting step, may eliminate the need to use settling tanks and may allow for a more high quality oil product to be produced.

The further broken-down protein that remains after the residual fat has been squeezed out may be then transferred to a protein dryer and then a hammer mill or another similar machine that may shred or crush the protein into smaller pieces, such as a protein powder, according to embodiments of the present disclosure.

It should be appreciated that the system and method for improved rendering may be used on any type of animal fat and/or bone according to embodiments of the present disclosure. Further, while certain machines have been described as being used in particular steps of the improved rendering method, it should be appreciated that other machines may be used in place of or in addition to those described to perform similar functions without departing from the present disclosure.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for improved rendering of animal products and a whole animal, the method comprising:
grinding and pre-breaking the animal products and the whole animal in a grinder and a pre-breaker machine, the pre-breaker machine configured to break up the animal products and the whole animal and the grinder configured to form ground materials;
transporting and heating the ground materials in one or more steam-jacketed tubes to create a slurry, as the ground materials liquefy; and
supplying pressure utilizing a progressive cavity pump without further mechanical action to move the slurry through the one or more steam jacketed tubes,
wherein the progressive cavity pump pushes approximately 8,000 pounds of the ground materials per hour,
wherein the progressive cavity pump utilizes a motor having approximately 1.25 horsepower,
wherein protein is separated from oil and water, and
wherein a residual liquid is removed from the protein.

2. The method of claim 1 wherein the ground materials are heated to a temperature of approximately 110 degrees Celsius in the heating step.

3. The method of claim 1 wherein pressure of approximately 4-5 ATM is applied to the ground materials in the heating step.

4. The method of claim 1 further comprising:
supplying pressure to the slurry between the heating step and the pressing step.

5. The method of claim 1 further comprising:
transferring the oil and water to a decanter; and
removing residual solids from the oil and water to form a solution.

6. The method of claim 5 wherein the decanter ranges in size from 10 microns to 1 millimeter.

7. The method of claim 5 further comprising:
centrifuging the solution to remove water and fine materials from the oil.

8. The method of claim 7 further comprising:
employing a vertical separator to further remove waste water and sludge from the oil.

9. The method of claim 8 further comprising:
employing a waste water oil separator to further separate oil from waste water; and
employing a sludge oil separator to further separate oil from the sludge.

10. The method of claim 9 wherein oil separated through use of the waste water oil separator and the sludge oil separator is returned to the decanter.

11. The method of claim 9 wherein oil separated through use of the waste water oil separator and the sludge oil separator is transferred to a storage tank.

12. The method of claim 1 further comprising:
applying pressure to the protein that has been separated from the oil and water via a protein press, thereby forming additional protein and removing the residual liquid from the additional protein.

13. The method of claim 12 further comprising:
transferring the removed residual liquid to a decanter.

14. The method of claim 12 further comprising:
transferring the additional protein to a protein dryer to form a dried protein; and
milling the dried protein to form a powder protein.

15. The method of claim 14 wherein the milling step is performed using a hammer mill.

16. A method for improved rendering of animal products and a whole animal, the method comprising:
grinding and pre-breaking the animal products and the whole animal in a grinder and a pre-breaker machine, the pre-breaker machine configured to break up the animal products and the whole animal and the grinder configured to form ground materials;
heating the ground materials in one or more steam jacketed tubes;
transporting the ground materials through the one or more steam jacketed tubes, as the ground materials liquefy, by applying a high pump pressure and liquefying the heated ground materials transported through the one or more steam jacketed tubes,
wherein a slurry is created;
pressing the slurry utilizing a progressive cavity pump without further mechanical action to separate protein from oil and water,
wherein the progressive cavity pump moves the slurry through the one or more steam-jacketed tubes,
wherein the progressive cavity pump pushes approximately 8,000 pounds of the ground materials per hour, and
wherein the progressive cavity pump utilizes a motor having approximately 1.25 horsepower;
applying pressure to the protein that has been separated from the oil and water via a protein press, thereby forming additional protein and removing residual liquid from the additional protein;
transferring the removed residual liquid to the decanter;
transferring the additional protein to a protein dryer to form a dried protein; and
milling the dried protein to form a powder protein.

17. A method for improved rendering of animal products and a whole animal, the method comprising:
grinding and pre-breaking the animal products and the whole animal in a grinder and a pre-breaker machine, the pre-breaker machine configured to break up the animal products and the whole animal and the grinder configured to form ground materials;
transporting and heating the ground materials in one or more steam-jacketed tubes to create a slurry, as the ground materials liquefy;
supplying pressure utilizing a progressive cavity pump without further mechanical action to move the slurry through the one or more steam jacketed tubes,
wherein the progressive cavity pump pushes approximately 8,000 pounds of the ground materials per hour,
wherein the progressive cavity pump utilizes a motor having approximately 1.25 horsepower, and
wherein protein is separated from oil and water;
transferring the oil and water to a decanter;
removing residual solids from the oil and water to form a solution;
removing water and extremely fine materials having a size below approximately 10 to 20 microns from the oil by centrifuging the solution to remove water and fine materials from the oil, thereby eliminating use of settling tanks;
employing a vertical separator to further remove waste water and sludge from the oil;
employing a waste water oil separator to further separate oil from waste water; and
employing a sludge oil separator to further separate oil from the sludge.

* * * * *